3,141,822
STABLE COMPOSITIONS OF ALKALI METAL SALTS OF SYNTHETIC PENICILLINS AND POLYACETIC ACIDS
Martin Goldberg, New Brunswick, N.J., assignor to Olin Mathieson Chemical Corporation, New York, N.Y., a corporation of Virginia
No Drawing. Filed Mar. 5, 1962, Ser. No. 177,265
2 Claims. (Cl. 167—65)

This invention relates to new compositions of synthetic penicillin. More particularly, this invention relates to stable synthetic penicillin compositions which may be administered orally or parenterally.

The synthetic penicillins of this invention are well known and are widely employed as antibacterial agents. They are particularly effective in the treatment of infectious diseases caused by gram-positive bacteria. Unfortunately, these synthetic penicillins when dissolved in water, are relatively unstable compounds, which at room temperature, rapidly lose their therapeutic activity. The instability of the aqueous solutions of the synthetic penicillins has required that the penicillins be distributed in a dry state for reconstitution by the physician immediately prior to administration, and in addition, many must be kept under refrigeration from time of reconstitution to time of administration. The disadvantages of such form of distribution and preservation are manifest. The fact that even under refrigeration, these aqueous penicillin solutions lose their therapeutic activity, after only relatively short periods of storage, i.e., 24 hours or less, requires that unused portions must be discarded. The fact that the powdered penicillin must be dissolved in water by the physician renders it difficult to control the desired dosage. Therefore, in order to permit any accuracy in metering the dry penicillin, the entire contents of a given package must be dissolved in a predetermined amount of water or that if only a portion of the resulting solution is used, the remainder, due to the lack of stability of the penicillin in water, even if held under refrigeration, must be discarded.

It has now been found that by use of the compositions of this invention, the foregoing disadvantages of the prior art are obviated and the preparation of a stable, physiologically acceptable composition of synthetic penicillin is made possible.

The compositions of this invention comprise a combination of a chemically synthesized penicillin or the salts thereof with a therapeutically acceptable organic acid and the physiologically acceptable salts thereof.

The chemically synthesized penicillins which may be employed to produce the final compositions of this invention are known. Examples of such compounds are dimethoxy phenyl penicillin, phenoxy ethyl penicillin, phenoxy methyl penicillin, phenoxy benzyl penicillin, α-amino phenyl penicillin, p-aminobenzyl penicillin, α-phenoxy propyl penicillin, methyl phenyl isoxazolyl penicillin, and the physiologically acceptable salts thereof, such as alkali metal salts, and the like. In the preferred embodiments of this invention, the alkali metal salts of the synthetic penicillins are employed.

The parenterally acceptable organic acids of this invention include such compounds as ethylenediamine tetraacetic acid, diethylene triamine pentaacetic acid, N-hydroxyethylenediamine triacetic acid, nitrilotriacetic acid, 1,2-diaminocyclohexane tetraacetic acid and the salts thereof. It is preferred to employ the ethylene diamine polyacetic acids in the practice of this invention.

To prepare the compositions of this invention, the desired synthetic penicillin is thoroughly blended with a small suitable amount of the desired stabilizing organic acid. It has been found that the amounts of acid which may be employed to give satisfactory results may be varied from about 1 to 30% by weight of the synthetic penicillin employed. Most preferably, the stabilizing acid and the salts thereof may be employed in a range equal to from 2 to 15% by weight of the synthetic penicillin.

The aqueous solutions of the compositions of this invention, unlike the aqueous synthetic penicillin solutions heretofore known, are stable for extended periods of time at room temperature. The compositions of this invention may be administered either orally or parenterally (e.g., intravenously and intramuscularly) in the treatment of conditions requiring antibacterial agents. The dosage for such use of course, depends on the final concentration and potency of the particular synthetic penicillin chosen. Thus when dimethoxy phenyl penicillin is used, a solution having a concentration as high as 450 mg. per ml. may be administered. In addition to the use of water for such purposes, the compositions of this invention may be reconstituted to administrable form with other suitable pharmaceutical vehicles, for examples, propylene glycol and other like material.

When the compositions of this invention are prepared for orally administrative dosages, additional ingredients may be included therein. The additional ingredients here contemplated may be added to enhance the flavor, nutrition, or the physical attractiveness of the compositions and include such ingredients as sugar, coloring, maltose, dextrose, and the like.

The following examples illustrate the compositions of this invention and the method for preparing it:

*Example 1*

One g. of sterile sodium dimethoxyphenyl penicillin is intimately blended with 50 mg. of sterile trisodium ethylenediamine tetraacetic acid by mixing under sterile conditions in a blender until homogeneity is obtained. The blend is then filled in a vial and stored until required. The composition is reconstituted by adding thereto 1.5 ml. of water for injection and the reconstituted composition is stored at room temperature. The resulting solution is stable for at least four days when stored at room temperature.

*Example 2*

200 mg. of sodium methylphenyl isoxazolyl penicillin is thoroughly blended with 20 mg. of trisodium hydroxyethyl ethylenediamine triacetic acid according to the process of claim 1. Upon reconstitution with 1 cc. of water, the resulting aqueous solution is stable for at least six days at room temperature.

*Example 3*

200 mg. of sterile sodium methylphenyl isoxazolyl penicillin is blended with 20 mg. sterile trisodium ethylenediamine tetraacetic acid. Upon reconstitution with 1 cc. of water the aqueous solution of this composition is stable for at least 14 days at room temperature.

Similarly, approximately 250 mg. of α-phenoxypropyl penicillin or approximately 250 mg. of α-aminophenyl penicillin or approximately 150 mg. of phenoxybenzyl penicillin may be substituted for methylphenyl isoxazolyl penicillin of this example, achieving like results.

Like results could also be obtained by substituting the appropriate amounts of diethylene triamine pentaacetic acid, nitrilotriacetic acid 1,2-diaminocyclohexane tetraacetic acid for the hydroxyethylene diamine triacetic acid of the above Example 2.

This invention may be otherwise embodied within the scope of the appended claims.

What is claimed is:

1. A stable pharmaceutical composition comprising an intimate blend of an alkali metal salt of a synthetic penicillin and a polyacetic acid selected from the group consisting of ethylenediaminetetraacetic acids, diethylenetriaminopentacetic acids, N-hydroxyethylenediaminopentacetic acids, nitrilotriacetic acids, and 1,2-diaminocyclohexanetetraacetic acids, said polyacetic acid being present in an amount of from about 1% to about 30% by weight of the said synthetic penicillin.

2. The composition of claim 1 wherein the polyacetic acid is ethylenediaminetetraacetic acid.

References Cited in the file of this patent

UNITED STATES PATENTS

| | | |
|---|---|---|
| 2,624,759 | Bersworth | Jan. 6, 1953 |
| 2,720,482 | Bryan et al. | Oct. 11, 1955 |
| 2,723,938 | Buckwalter et al. | Nov. 15, 1955 |
| 2,872,375 | Weitnauer et al. | Feb. 3, 1959 |
| 2,951,015 | Berger | Aug. 30, 1960 |

OTHER REFERENCES

Swallow: "The Preparation of Stable Solutions of Cystalline Penicillin," Pharm. J. 168: 467 (1952), abstracted in Amer. J. Pharmacy, 124 (8), page 287, August 1952.